US012677987B2

(12) United States Patent     (10) Patent No.:   US 12,677,987 B2

Skinner et al.     (45) Date of Patent:   *Jul. 14, 2026

---

(54) LID FOR COOKING APPLIANCE

(71) Applicant: Sunbeam Products, Inc., Atlanta, GA (US)

(72) Inventors: Mark Skinner, Manchester (GB); Stewart Gordon, Cheadle (GB)

(73) Assignee: Sunbeam Products, Inc., Atlanta, GA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/497,433

(22) Filed: Oct. 30, 2023

(65) Prior Publication Data

US 2024/0057810 A1    Feb. 22, 2024

Related U.S. Application Data

(63) Continuation of application No. 16/936,734, filed on Jul. 23, 2020, now Pat. No. 11,839,327.

(60) Provisional application No. 62/878,822, filed on Jul. 26, 2019.

(51) Int. Cl.
| | |
|---|---|
| *A47J 37/12* | (2006.01) |
| *A47J 36/06* | (2006.01) |
| *A47J 45/06* | (2006.01) |
| *A47J 27/00* | (2006.01) |

(52) U.S. Cl.
CPC ............... *A47J 36/06* (2013.01); *A47J 45/06* (2013.01); *A47J 27/002* (2013.01)

(58) Field of Classification Search
CPC .......... A47J 36/06; A47J 45/06; A47J 27/002; A47J 27/12; A47J 27/0802; A47J 27/0815; A47J 27/086; A47J 27/09; A47J 37/1257; A47J 37/1266; A47J 37/128
USPC .............................. 220/315, 573.1, 293, 912
See application file for complete search history.

(56) References Cited

U.S. PATENT DOCUMENTS

| | | | | |
|---|---|---|---|---|
| 2,785,277 A * | 3/1957 | Jepson | ................ | A47J 37/1209 |
| | | | | 99/410 |
| 6,669,047 B2 * | 12/2003 | Wooderson | ......... | A47J 27/0813 |
| | | | | 220/203.27 |
| 8,276,507 B1 * | 10/2012 | Walker | .................... | A47J 27/08 |
| | | | | 220/573.1 |
| 2019/0045973 A1 * | 2/2019 | Gill | ........................ | A47J 27/086 |
| 2020/0000263 A1 * | 1/2020 | Peng | ................... | A47J 27/0802 |

FOREIGN PATENT DOCUMENTS

| | | | | | |
|---|---|---|---|---|---|
| IT | 1057311 | * | 3/1982 | ............ | A47J 37/105 |
| IT | 1057311 B | | 3/1982 | | |

* cited by examiner

*Primary Examiner* — Nathan J Jenness
*Assistant Examiner* — Elizabeth J Volz
(74) *Attorney, Agent, or Firm* — Husch Blackwell LLP

(57) ABSTRACT

The present invention refers a kitchen appliance that includes a lid and a vessel. Handles associated with each of the lid and the vessel include electrical connectors (e.g., a plug, socket) so that when the lid is placed on the vessel, power is provided to the lid via the electrical connectors associated with the lid and vessel, respectively.

18 Claims, 5 Drawing Sheets

LID FOR COOKING APPLIANCE

CROSS-REFERENCE TO RELATED APPLICATIONS

This Application is a continuation application of U.S. application Ser. No. 16/936,734, filed on Jul. 23, 2020, which claims the benefit of priority from U.S. provisional application Ser. No. 62/878,822, filed on Jul. 26, 2019, entitled "LID FOR COOKING APPLIANCE". The entire disclosures of both applications are incorporated herein by reference.

FIELD OF INVENTION

The invention refers to a lid of a kitchen appliance. More specifically, this invention refers to a kitchen appliance having a lid and a vessel that includes at least one electrical connector located in at least one of the appliance's handles such that when the lid is placed on the vessel, power is provided to the lid via the at least one electrical connector.

BACKGROUND OF THE INVENTION

Kitchen appliances are quite useful for preparing and cooking food in today's busy society. Although kitchen appliances can be very useful, they can also be dangerous if they are improperly used. For example, kitchen appliances can be turned on when components of the appliance have not been engaged. In one such dangerous scenario, an air fryer lid, air fryer vessel, a blender base and/or a blender may inadvertently be turned on even when not used with other components with which they typically operate. When those components are turned on, the user may be injured or the appliance's surroundings may be damaged due to the heat generated by the appliance, the blades, or other any other component of the appliance. A safer appliance that cannot be accidently turned on is therefore desirable.

Furthermore, appliances may have multiple parts or components which may require electricity or power. For example, the lid of an air fryer requires electricity to prepare the food. Typically, electricity is transmitted from the vessel of the air fryer to power components within the lid. However, in order for electricity to reach the lid, the lid and vessel must be connected through at least one wire, electrical connector, electrical conduit, or the like. Because the lid must be capable of opening to allow food to be placed within the vessel, wires may be placed within the hinge connecting the lid and vessel. Such wires, however, often break due to repeated stresses caused by the lid being opened or closed repeatedly. If such a wire breaks, the appliance can no longer be used. It is therefore also desirable to provide a construction that ensures that the lid is able to receive electricity through the vessel without the appliance breaking due to a snapped wire.

SUMMARY OF THE INVENTION

An appliance including a lid and a vessel is provided. The vessel includes a container capable of holding items, such as food products (cooked or uncooked), there within. The vessel further preferably includes at least one vessel handle that projects from a sidewall of the vessel. The vessel handle may be used to lift the vessel or appliance. Each vessel handle includes a bottom vessel face and a vessel handle lip projecting from and circumscribing the bottom vessel face to form a vessel handle cavity. The vessel handle further includes a socket that projects from the bottom vessel face within the vessel handle cavity. The socket within the vessel handle is connected on one end to a wire located within the sidewall of the vessel that extends out from the sidewall so that the wire may be inserted into a wall socket to power the appliance. The vessel handle also includes a handle flap which selectively covers the cavity within the vessel handle when the vessel and lid are not engaged. The handle flap allows the vessel handle to be more comfortably used to lift the vessel.

The appliance further preferably includes a lid. The lid includes a circular portion and at least one lid projection. The lid projection extends from a first lid end and past the second lid end, and is located and positioned in a position that corresponds to the socket within the vessel handle cavity. The lid projection or lid projections are shaped and sized so that the lid projections may be used as handles to lift the lid. The lid projections further include at least one plug. The plug is shaped and sized so that the plug maybe inserted into and received within the socket of the vessel. Once the plug and socket are engaged, the plug and socket complete a power circuit, allowing electricity from the plug within the wall socket to reach the lid. As such, the lid cannot be activated without the lid and vessel engaging each other.

BRIEF DESCRIPTION OF THE DRAWINGS

For a better understanding of the various embodiments of the present invention, reference may be made to the accompanying drawings in which.

Figure 1:
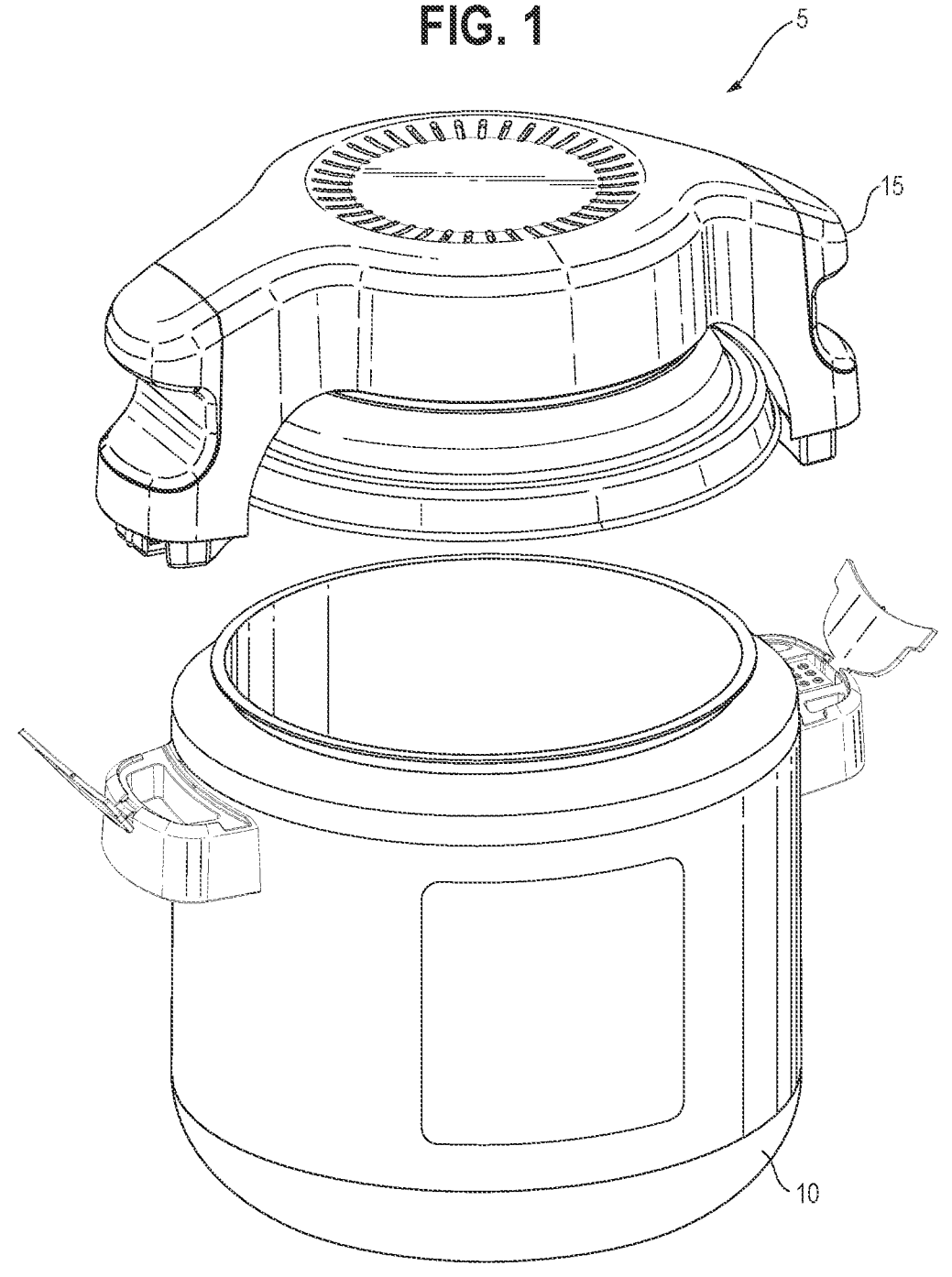
FIG. 1 is an exploded view of an appliance with a vessel and a lid disengaged.

While the disclosure is susceptible to various modifications and alternative forms, specific embodiments thereof are shown by way of example in the drawings and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE DRAWINGS

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

As illustrated in FIG. 1, an appliance 5 that may be used to cook food items generally includes each of a vessel 10 and a lid 15. The vessel 10 and the lid 15 are selectively engageable with one another, as will be described in more detail hereinafter.

Figure 2:
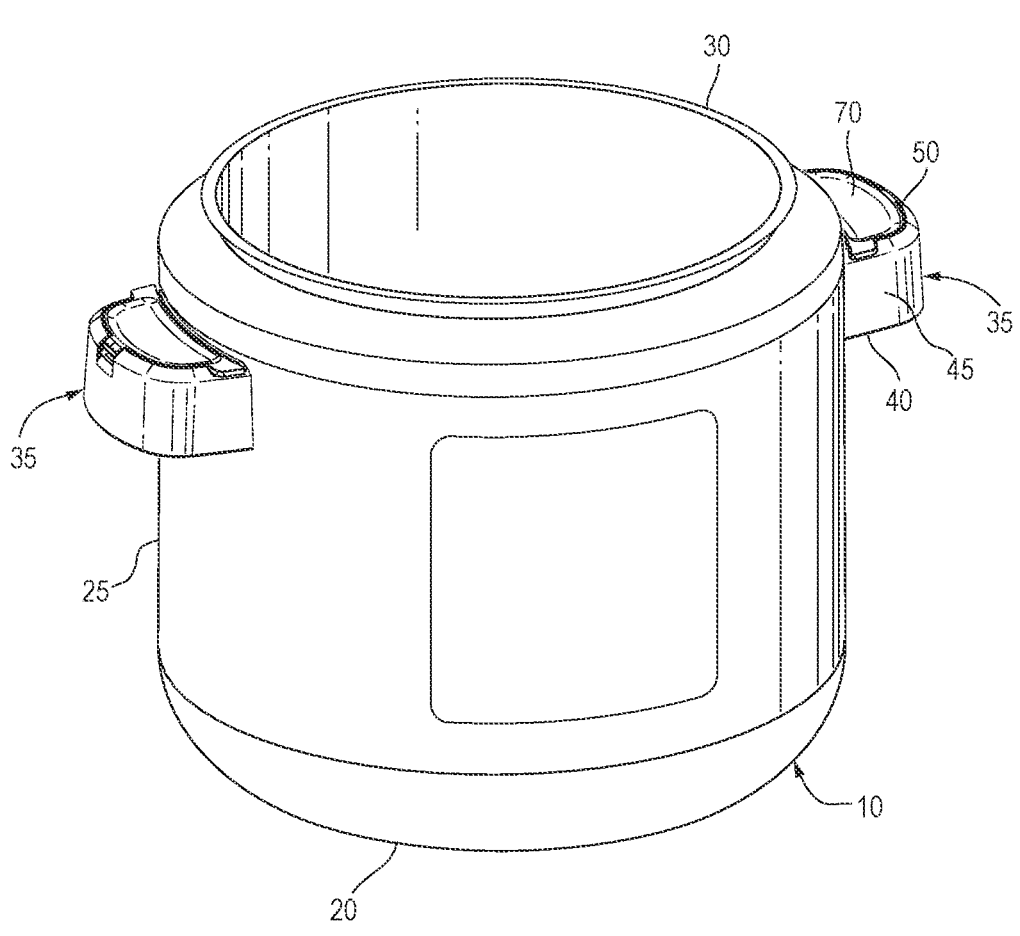
FIG. 2 is a perspective view of the vessel of FIG. 1.

The vessel 10 (illustrated in greater detail in FIGS. 2 and 3) preferably includes a base 20 and a sidewall 25. In one embodiment, the base 20 is a planar circular member. The sidewall 25 projects upwardly away from the base 20 to form a container capable of containing or holding food products therein. The vessel 10 further includes a vessel rim 30 that extends around the circumference of the vessel 10, which is illustrated as substantially circular, though other shapes are foreseeable.

The vessel 10 also includes at least one vessel handle 35 that projects from the sidewall 25 of the vessel 10 so that a person may use the at least one vessel handle 35 to lift and carry the vessel 10 (or appliance 5 if the lid 15 is selectively engaged with the vessel 10). In a preferred embodiment, the vessel 10 has two vessel handles 35. The vessel handles 35 are preferably located and positioned opposite from each other so that the vessel handles 35 may be more easily used to lift the vessel 10 or appliance 5. Each vessel handle 35 may extend from the sidewall 25 of the vessel 10 in a generally "C-shape," although other shapes are envisioned. The vessel handle 35 includes a bottom vessel face 40, with a vessel handle lip 45 projecting away from the bottom vessel face 40 forming both a vessel handle rim 50 and a vessel handle cavity 55.

The vessel 10 may further include a socket 60. In one embodiment, the socket 60 may be located and positioned within one of the vessel handle cavities 55 of the vessel handle 35. In alternative embodiments, the vessel 10 may include multiple sockets 60, with a socket 60 located in each vessel handle 35, or only in a portion of the at least one socket 60. In yet another embodiment, the socket 60 may be a female socket that projects away from the vessel bottom face 40 towards the vessel handle rim 50. In alternative embodiments, the female socket 60 located within the vessel handle cavity 55 may be a male plug. In one embodiment, the female socket 60 is electronically connected to a power source.

The vessel handle 35 further also preferably includes a vessel handle flap 70 associated with each vessel handle 35. The vessel handle flaps 70 each have a first flap position and a second flap position. In the first flap position or closed flap position see FIG. 2), the vessel handle flaps 70 are located and positioned so that the vessel handle flap 70 is adjacent to and abuts the vessel handle rim 50. The female socket 60 located within the vessel cavity 55 may therefore be hidden or covered (and thus inaccessible) by each vessel handle flap 70. The vessel handle flap 70 preferably covers the socket 60 in a manner that allows the vessel handle 35 and handle flap 70 to engage one other so that the vessel handles 35 may be comfortably used as handles.

Figure 3:
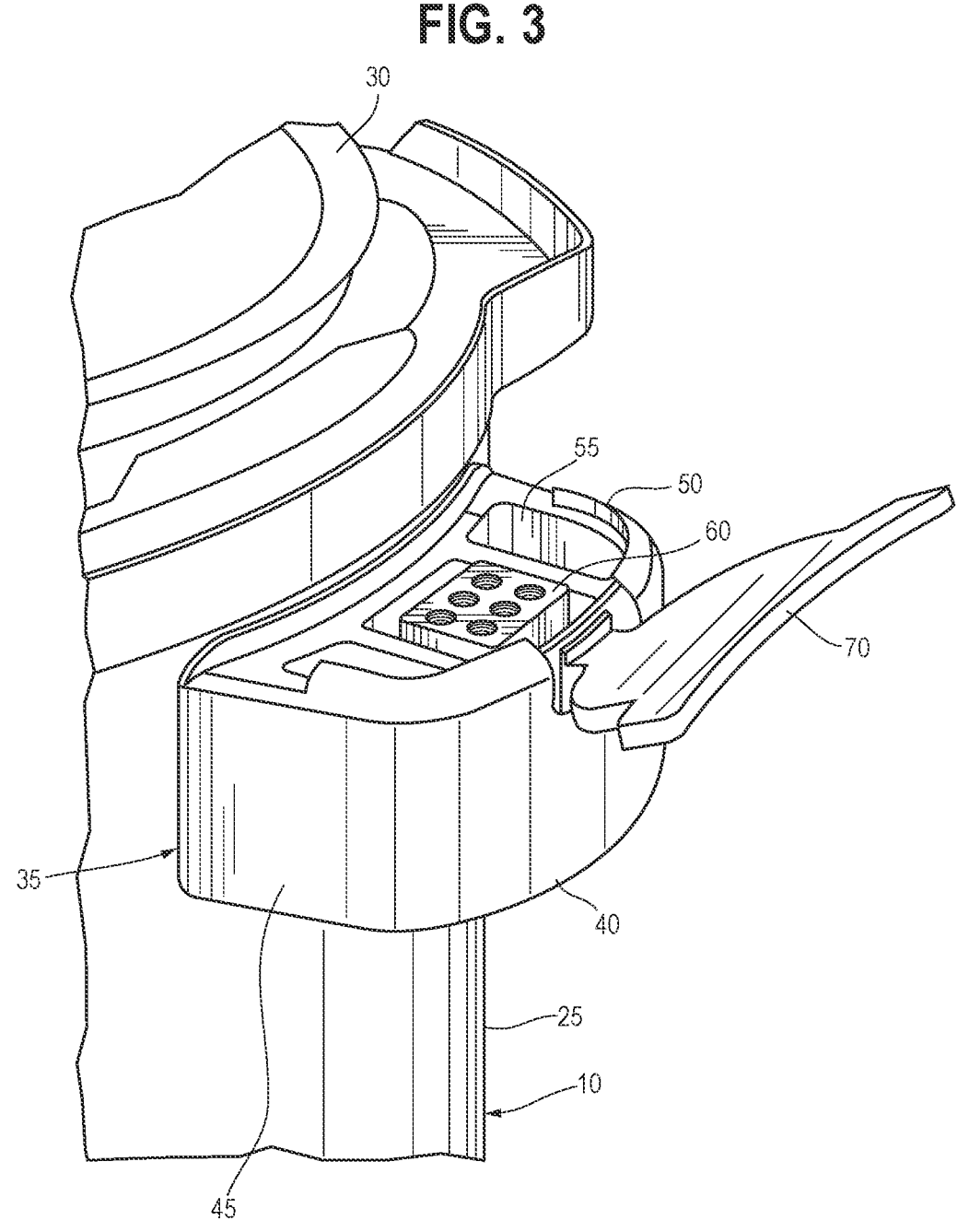
FIG. 3 is an enlarged perspective view of a vessel handle of the vessel of FIGS. 1 and 2 in an open position.

On the other hand, the vessel flap 70 is illustrated in the second flap position in FIG. 3. In the second flap position or open flap position, the vessel 10 and lid 15 may selectively engage with one another, as described in more detail below.

Figure 4:
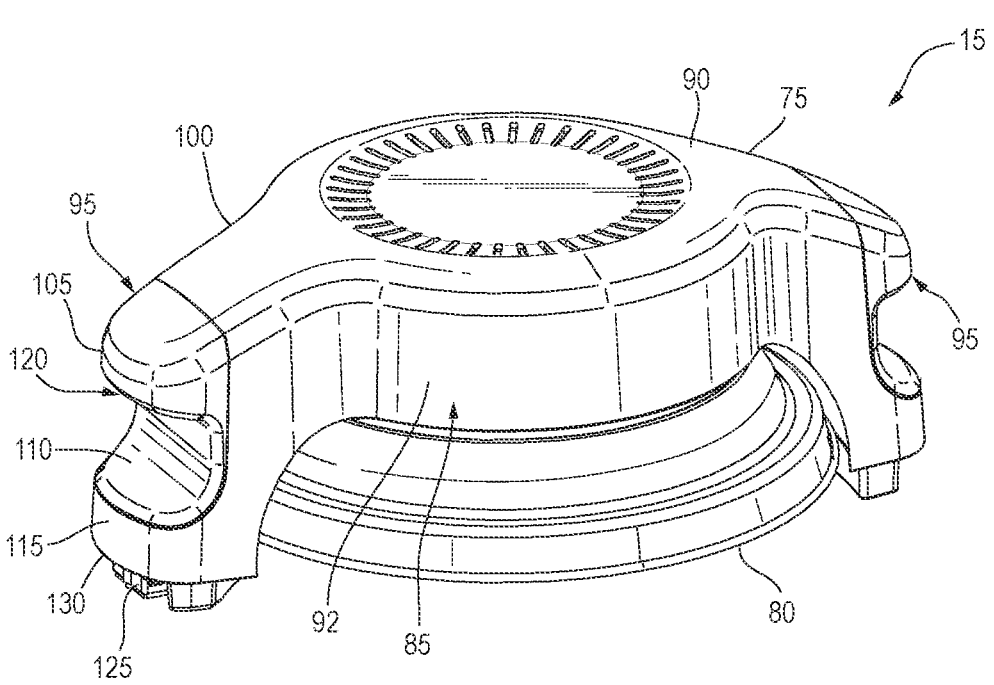
FIG. 4 is an enlarged perspective view of the lid of FIG. 1.

Turning to FIG. 4, in one embodiment, the lid 15 (illustrated as an air fryer lid) has an upper lid portion 75 and a lower lid portion 80. The lid 15 may have a circular portion 85, which preferably has a top face 90 located and positioned at the upper lid portion 75. The top face 90 is preferably a substantially planar surface with a lid sidewall 92 that extends from the top face 90, or from the upper lid portion 75, to the lower lid portion 80.

The lid 15 further also preferably includes at least one projection 95 that projects from the lid sidewall 92. In one embodiment, the lid 15 includes two projections 95. The two lid projections 95 are located opposite from each other and correspond to the locations of the vessel handles 35 (illustrated in FIGS. 2 and 3). Each lid projection 95 extends from the upper lid portion 75 downwardly towards, and past, the lower lid portion 80. In one embodiment, the lid projection 95 includes a lid slope 100 which gradually extends away from the top face 90 at the upper lid portion 75.

The lid projection 95 further includes a first lid projection sidewall 105, a curved sidewall 110, and a second lid projection sidewall 115. The first lid projection sidewall 105 extends downwards from the lid slope 100 towards the lower lid portion 80 before curving inwardly towards the center of the lid 15, thereby forming a curved sidewall 110. The curved sidewall 110 may then curve outwards, away from the center of the lid 15. The curved sidewall 110 may therefore also have a "C-shape," like the vessel handles 35. The second lid projection sidewall 115 of the lid projection 95 preferably extends downwards and away from the upper lid portion 75. The lid slope 100, the first lid projection sidewall 105, the curved sidewall 110, and the second lid projection sidewall 115 form a lid handle 120. The lid handle 120 may be used to lift the lid 15 off the vessel 10, as well as used to lift the appliance 5 if the lid 15 and vessel 10 are engaged to each other.

The lid projection 95 further includes a plug 125 that extends downwardly from a bottom lid projection face 130 that is adjacent to the second lid projection sidewall 115. The bottom lid projection face 130 may be substantially perpendicular to the second lid projection sidewall 115.

Figure 5:
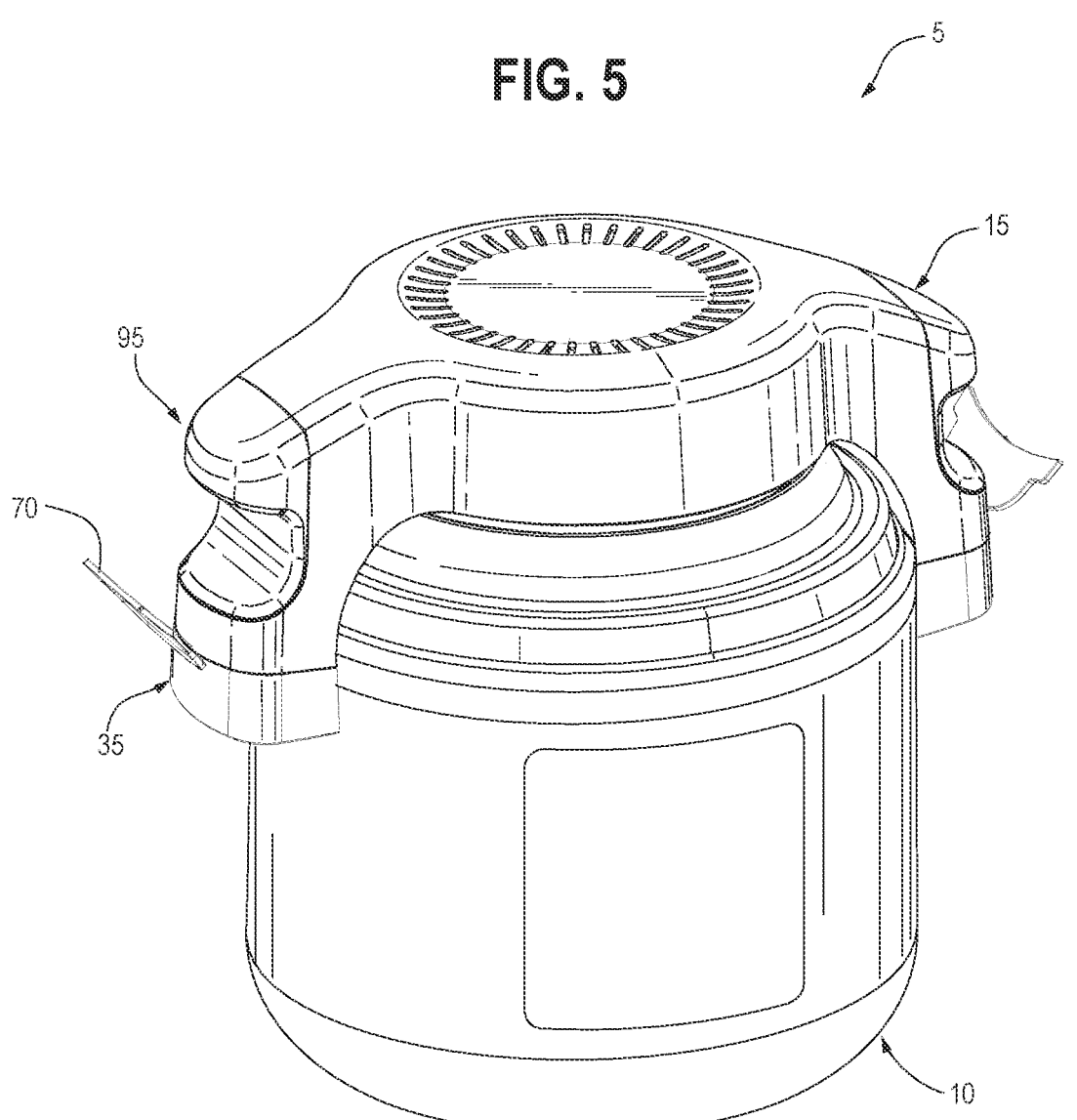
FIG. 5 is a perspective view of the lid and vessel of FIG. 1 engaged with one another.

As provided in FIG. 5, the plug 125 is preferably located and positioned so that the plug 125 is received within and subsequently coupled to the socket 60 when the lid 15 is placed on, and aligned with, the vessel 10. In one embodiment, the plug 125 is in a "male" configuration, and the socket 60 is in a "female" configuration, as can be appreciated by those skilled in the art. In alternative embodiments, the plug 125 may be a female socket, and the socket 60 is a male plug. In any of those embodiments, the socket 60 and the plug 125 selectively engage one other (when aligned) to form a connector, or circuit, so that electricity is able to run from a power source through the vessel 10 to the lid 15. The lid 15 therefore cannot receive power and will not work if the lid 15 and the vessel 10 are not engaged. The appliance 5 is thus safer because the lid 15 cannot accidently be turned on when the appliance 5 is in an open position, or when the lid 15 is not engaged with the vessel 10. Further, problematic cords that may typically be associated with a lid such as the lid 15 may be eliminated.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An appliance comprising:
a vessel including at least one vessel handle configured for carrying the vessel; and
a lid including:
at least one lid handle configured for carrying the lid; and
a heating element and a fan;
wherein the lid is configured to engage with the vessel, and wherein the lid is configured to air fry contents within the vessel via the heating element and the fan;
wherein the at least one lid handle is substantially C-shaped and includes a first lid projection sidewall, a curved sidewall, and a second lid projection sidewall;
wherein the curved sidewall curves inwardly from the first lid projection sidewall toward a center point of the at least one lid handle; and
wherein the curved sidewall curves outwardly from the center point of the at least one lid handle toward the second lid projection sidewall.

2. The appliance of claim 1, wherein the vessel includes two vessel handles.

3. The appliance of claim 1, wherein the curved sidewall of the at least one lid handle is configured for gripping by a user.

4. The appliance of claim 1, wherein the at least one lid handle comprises a first handle and a second handle, and wherein the first handle and the second handle are located substantially opposite one another.

5. An appliance comprising:
a vessel including at least one vessel handle configured for carrying the vessel; and
a lid including:
a lid body;
at least one lid handle configured for carrying the lid, wherein the at least one lid handle is defined within the lid body; and
a heating element and a fan;
wherein the lid is configured to engage with the vessel, and wherein the lid is configured to air fry contents within the vessel via the heating element and the fan;
wherein the at least one lid handle is substantially C-shaped and includes a first lid projection sidewall, a curved sidewall, and a second lid projection sidewall;
wherein the first lid projection sidewall, curved sidewall, and second lid projection sidewall are each defined within the lid body;
wherein the curved sidewall curves inwardly from the first lid projection sidewall toward a center point of the at least one lid handle; and
wherein the curved sidewall curves outwardly from the center point of the at least one lid handle toward the second lid projection sidewall.

6. The appliance of claim 5, wherein the vessel includes two vessel handles.

7. The appliance of claim 5, wherein the curved sidewall of the at least one lid handle is configured for gripping by a user.

8. The appliance of claim 5, wherein the at least one lid handle comprises a first handle and a second handle, and wherein the first handle and the second handle are located substantially opposite one another.

9. A lid comprising:
at least one lid handle configured for carrying the lid;
a heating element; and
a fan;
wherein the lid is configured to air fry contents within a corresponding vessel via the heating element and the fan;
wherein the at least one lid handle is substantially C-shaped and includes a first lid projection sidewall, a curved sidewall, and a second lid projection sidewall;
wherein the curved sidewall curves inwardly from the first lid projection sidewall toward a center point of the at least one lid handle;
wherein the curved sidewall curves outwardly from the center point of the at least one lid handle toward the second lid projection sidewall; and
wherein the at least one lid handle comprises a first handle and a second handle, and wherein the first handle and the second handle are located substantially opposite one another.

10. The lid of claim 9, wherein the first lid projection sidewall extends downward toward a base of the lid.

11. The lid of claim 9, further comprising:
a vessel including at least one vessel handle configured for carrying the vessel.

12. The lid of claim 11, wherein the lid is configured to engage with the vessel.

13. The lid of claim 9, wherein the curved sidewall of the at least one lid handle is configured for gripping by a user.

14. An air frying system, comprising:
a vessel including a base and a sidewall that projects upwardly away from the base to form a container configured to hold food products therein;
two or more vessel handles located and positioned opposite each other along the sidewall of the vessel, wherein each of the two or more vessel handles project away from the sidewall of the vessel such that the two or more vessel handles are configured to be used to lift and carry the vessel;
an air fryer lid having a heating element and a fan, the air fryer lid being selectively engageable with the vessel and configured to air fry the food products held within the container via the heating element and the fan, the air fryer lid further including an upper lid portion, a lower lid portion, and a lid sidewall that extends from the upper lid portion to the lower lid portion; and
two or more lid handles used to lift the air fryer lid off of the vessel and formed as part of the lid sidewall, each lid handle being defined by a curved sidewall portion with a first sidewall portion that curves inwardly toward a center of the air fryer lid and a second sidewall portion that curves away from the center of the air fryer lid.

15. The air frying system of claim 14, wherein the air fryer lid further comprises a circular portion with a top face located and positioned at the upper lid portion.

16. The air frying system of claim 15, wherein the two or more lid handles are positioned at opposing sides of the circular portion.

17. The air frying system of claim 16, wherein the two or more lid handles each define a recess in the air fryer lid.

18. The air frying system of claim 14, wherein the air fryer lid is incapable of being turned on when the air fryer lid is in an open position or when the air fryer lid is not engaged with the vessel.

* * * * *